United States Patent [19]
Pelster et al.

[11] 3,735,693
[45] May 29, 1973

[54] HOT OIL RECIRCULATING COOKING SYSTEM

[75] Inventors: Arthur F. Pelster; Eugene C. Johns; Norman C. Sullivan, all of Nashville, Tenn.

[73] Assignee: Kentucky Fried Chicken Corporation, Louisville, Ky.

[22] Filed: Feb. 23, 1972

[21] Appl. No.: 228,598

[52] U.S. Cl..................................99/408, 99/403
[51] Int. Cl................................A47j 37/12
[58] Field of Search...................99/403, 408, 355, 99/352, 330, 404; 210/167, 171, DIG. 8

[56] References Cited

UNITED STATES PATENTS

| | | | |
|---|---|---|---|
| 2,886,439 | 5/1959 | Eytiuge | 99/404 X |
| 2,978,975 | 4/1961 | Rossi | 99/330 |
| 3,483,982 | 12/1969 | Nelson | 99/408 |
| 2,827,379 | 3/1958 | Phelan | 99/330 |
| 3,280,722 | 10/1966 | Rahauser | 99/330 X |
| 3,036,513 | 5/1962 | Reeves | 99/404 |
| 3,495,525 | 2/1970 | Piotrowski | 99/403 X |

*Primary Examiner*—Leon G. Machlin
*Attorney*—Elmer R. Helferich, Norman N. Schuttlev, John T. Kelton et al.

[57] ABSTRACT

Hot oil recirculating cooking system for deep fat frying of food, such as chicken parts, including a cooking pot chamber having a bottom outlet and a top inlet. Through flow conduit means connect the bottom outlet to the top inlet where the returned oil is delivered into the pot chamber by spray nozzles. This conduit means includes a pump and a horizontally oriented, closed, openable cylindrical filter tank containing removable filtering equipment. The cooking pot is transversely rectangular with a pair of its opposed, widely spaced sidewalls shaped inwardly toward each other at the bottom of a frying zone of its chamber to provide a pair of upwardly facing, crowned shoulder ledges. Depending from these shoulder ledges these opposed shaped sidewalls define therebetween a downwardly converging, relatively narrow cold zone deep well closed off by a horizontal bottom section, with the other opposed pair of pot sidewalls being arranged in transversley spaced, vertical planes to define convergingly shaped, narrow end walls of this well. The mergence portions of these shaped sidewalls which define these shoulder ledges and the deep well sidewalls are smoothly convexed inwardly and the well bottom section is smoothly convexed outwardly in bubous fashion. The pot chamber outlet opening is provided oi in one well end wall at the bottom of this bulbous section for effective clean-out of particulate solids into the conduit line. The outlet opening is connected throuh a shut-off valve to an inlet end section of the horizontally oriented filter tank with this inlet section being closed off by a removable lid which carries a valved rain and suction tube. The cylindrical filter chamber has nested therein downstream of its inlet section a removable, rigid, foraminous, cup-shaped basket which supports therein an open-mouth filter bag, and the transverse downstream end of the filter tank has an outlet opening flow connected by a conduit section to the inlet of the pump. The pump outlet is flow connected by a supply conduit section which extends over the rim of the open top of the cooking post down to its chamber for flow connection therein of a nozzle assembly. The nozzle assembly is located at the end wall of the well opposite that which has the outlet opening, and it includes a pair of lateral nozzles each located at one of the mergence shoulder ledges with jet openings thereof directed laterally toward the opposite outlet opening-equipped end wall for washing particulate solids off of this shoulder ledge down into the well. Another nozzle of this assembly depends down into the well to direct a jet therefrom along the bulbous bottom section of the latter for sweeping into the outlet opening particulate solids which tend to collect in this section. A lateral, foraminous, food-supporting rack is supported on the pair of shoulder ledges immediately above the pair of lateral nozzles so that pieces of food thereon will be in the hot frying zone of the hot oil pooled in the pot chamber. A small aspirating and bleed aperture is provided in this supply conduit section in the vicinity of the intended surface of the pooled hot oil. Burners are provided externally of the pot chamber on opposite sides of the cold zone deep well for heating the well walls in their shoulder mergence portions and therebelow, and the oil pooled thereabove in the frying zone.

10 Claims, 4 Drawing Figures

United States Patent [19]
Pelster et al.
[11] 3,735,693
[45] May 29, 1973
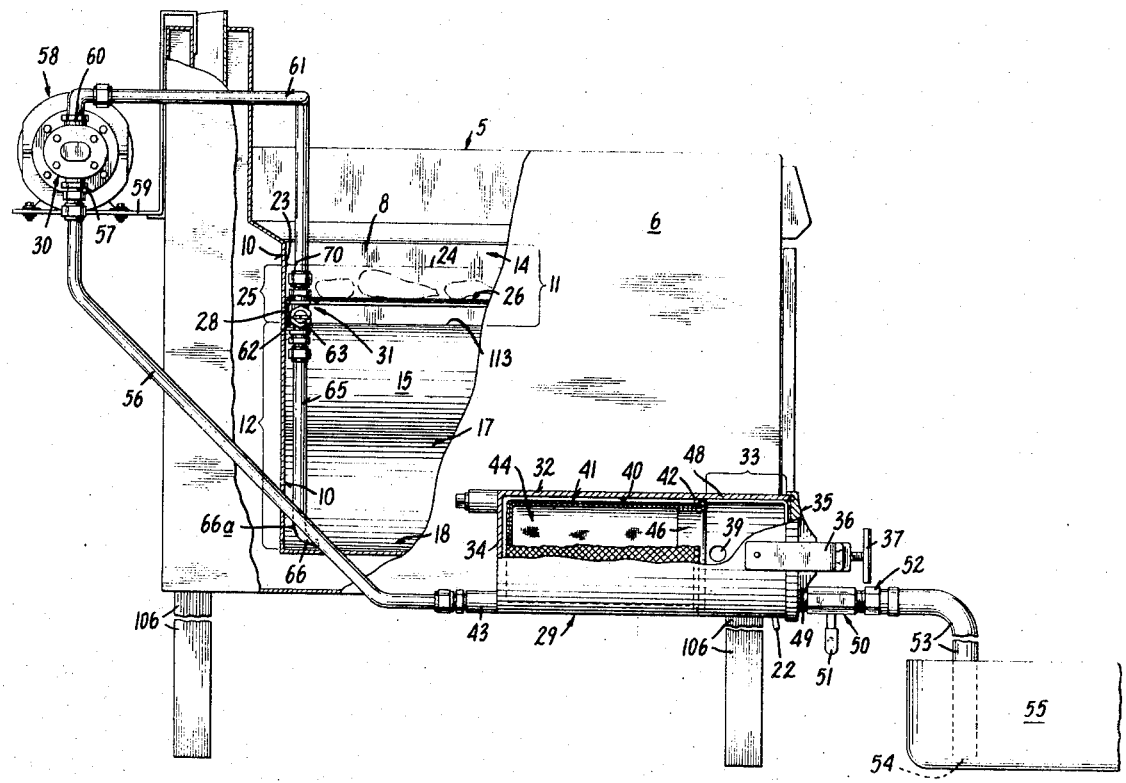

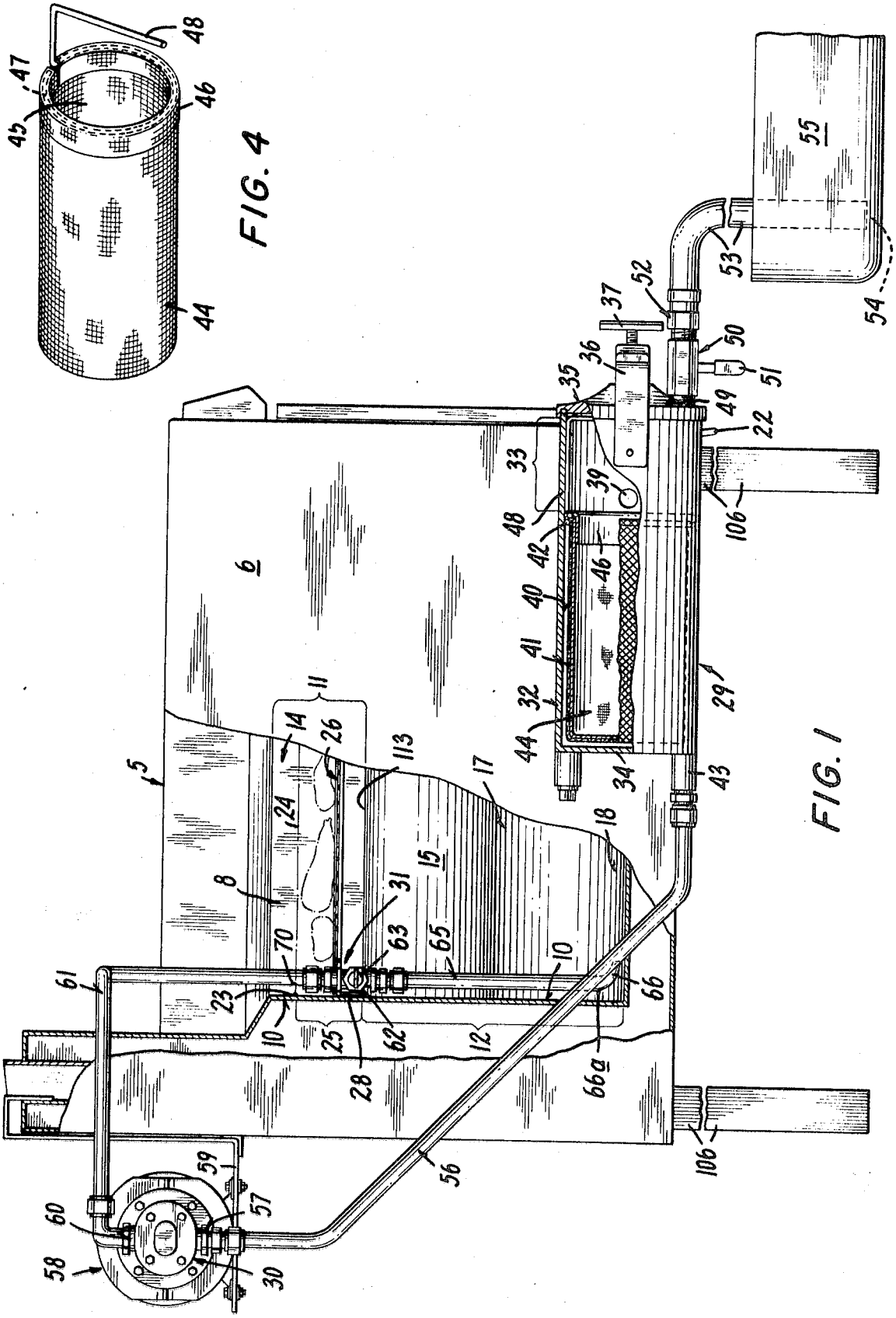

HOT OIL RECIRCULATING COOKING SYSTEM

BACKGROUND AND SUMMARY

The present invention relates to cooking systems for deep fat frying of food, such as chicken parts, that include cooking pots for holding pooled hot oil in which the food is to be immersed for frying. It is particularly concerned with such a system which makes provision for recirculating in the frying cycle the hot oil pooled in the pot chamber for passage through a filter.

Such a system has been proposed in the Longmire U.S. Pat. No. 3,107,601 of Oct. 22, 1963. However, features thereof are undesirable and present problems. The oil pooled in the cooking pot chamber is heated by heat-transfer coils immersed in this oil, and while there may be mounted in such a pot chamber a remotely-located thermostatic element to control energization of the immersed heating coils in an attempt to limit the maximum elevation of the temperature of the pooled oil this has proven to be inadequate. The temperature of the cooking oil should not exceed about 425° F. in order to avoid so scorching it as to impart thereto an undesirable flavor to the fried food and which will break it down with limitation of its useful life. Tests have shown that of the surfaces of such immersed heating coils the temperature of the oil may be raised to a temperature of about 525° F. The filter unit is of complicated and costly construction and cleaning its interior requires disconnection thereof from the oil recirculating system and pivoting tilt out of its upright operative position to allow cleaning access to its interior. This filter also requires the use of an additional heater therein. The returned hot oil is spilled into the pot chamber through an inlet hole in the top section of the cooking pot sidewall, and no provision is made for preventing accumulation of crackling and particulate solids in the bottom of the pot chamber.

The Wagner U.S. Pat. No. 3,314,416 of Apr. 18, 1967 proposes a pressurized cooking pot having a sealing cover, and no hot oil recirculating system is proposed which could include a filter for cleaning the oil during a cooking cycle. The transversely rectangular cooking pot has a bottom section in which one of a pair of opposed sidewalls is curved inward for convergence thereof to provide a relatively narrow, depending, cold zone deep well. Consequently, a gas burner heat source is located on only one side of this deep well to heat its sidewall on that side and the convergence shoulder thereabove. Such imbalance of the application of external heat can provide vertical zones in the pooled oil in which there is appreciable differential in heat distribution from zone to zone, so that a load of food suspended in a basket which is lowered to the vicinity of the mouth of the cold zone deep well may be fried to degrees of appreciably different crispness. The food which is supported in the vicinity of the back side of the cooking pot, where heat is not directly applied, may be underdone while that located over the position of the gas burner may become well fried or overdone. The narrow closed bottom of the cold zone deep well is flat and horizontal to provide a shelf upon which particulate solids loosened from the frying food readily can collect. The outlet opening for the pot chamber is located in this flat shelf at some undisclosed point along the extent thereof and no provision is made for sweeping such collected solids thereinto, for easy removal from the deep well.

These and other problems of the prior art are effectively and efficiently overcome by the present invention.

The present hot oil recirculating cooking system has embodied therein a combination of a chambered cooking pot having sidewalls thereof shaped to define therebetween a relative wide frying zone section and therebelow a downwardly converging and narrower, depending cold zone deep well; exterior heating means which applies heat to at least one side of this deep well, and preferably to both shaped sides thereof, as well as to at least one overhanging, shoulder ledge-defining portion which merges the sidewall of the frying zone section on that side with one of the opposed downwardly converging sidewalls of this deep well; and a discharge nozzle assembly connected to the delivery end of recirculating conduit means and located in one side of the bottom of the frying zone section and the adjacent end of the closed lateral bottom section of the deep well, so as to wash particulate solids from this shoulder ledge and to sweep these particulate solids along the lateral well bottom section into the remote outlet to which the intake of the recirculating conduit means is connected.

Preferred similar shaping of the lower portions of the transversely spaced and opposed sidewalls of the cooking pot structure defines therebetween the cold zone deep well below the wider frying zone section which causes the mergences in both sidewalls to define in the vicinity of the bottom of the frying zone section an opposed and laterally spaced pair of such upwardly facing shoulder ledges. Such shaping and mergences of these opposed sidewalls are similar in an allochiral sense. The cold zone deep well area defined between these opposed sidewalls is closed off on opposite ends by preferably flat end walls and at the bottom by an elongated and relatively narrow bottom section which forms an elongated transverse shelf that is generally horizontal from end-to-end, so that together they define a closed deep well compartment. This deep well compartment is provided with a pot chamber flow outlet in the vicinity of one of these end walls, and preferably in one of the latter as a lateral, flow-directing, discharge opening at a point of lowest elevation. In the preferred form the so shaped cold zone deep well sidewalls are located generally symmetrically with respect to the frying zone chamber sidewall portions thereabove and between upwardly extending planes of inner faces of the latter with the well bottom section arranged substantially intermediate these planes. In this embodiment the mergence portions of these opposed pot chamber sidewalls which define the pair of laterally-spaced shoulder ledges and the major portions of the opposed deep well sidewalls are smoothly convexed inwardly and the well bottom section is smoothly convexed outwardly in bulbous fashion to discourage collection of particulate solids thereon and to encourage fall thereof into the medial zone of the well bottom section for general alignment with the lateral, flow-directing, discharge opening.

The exterior heating means which applies heat externally to wall portions of the cooking pot preferably are in the form of a pair of gas burners with each located in one of the side spaces that is bounded by the inwardly convexed portion and the overhanging, shoulder ledge-defining portion of the sidewall on that side. Thus each of these burners transmits heat efficiently by radiation and convection to one of the deep well sidewall portions and the overhead shoulder ledge thereabove for effective conductive transfer to the oil in the well and in the superposed frying zone.

The discharge nozzle assembly has a pair of lateral jet directing nozzles with each associated with the transverse end of one of the shoulder ledges which is most remote from the discharge outlet. Each lateral nozzle preferably is in the form of an elongated, transversely extending tube closed off at its outer end and mounted immediately above, such as by resting upon, the shoulder ledge with which it is associated. Each such nozzle tube preferably has a series of longitudinally spaced apart jet openings in the side thereof which faces toward the other end of the shoulder ledge above which it is mounted effectively for washing particulate solids off of the latter down into the well bottom section. These tubular nozzles are oppositely directed from common connection to the delivery end of the recirculating conduit means with this conduit end preferably being located in the mouth or top of the deep well substantially medially between the pair of shoulder ledges. The jets of oil emanating from the pair of lateral nozzles also assures an even distribution of heat in the oil pooled in the cooking pot chamber. This nozzle assembly also includes a depending nozzle tube extending from the conduit delivery end down into the end of the well bottom section therebelow with its bottom end or tip turned laterally forward and having at least one jet opening to direct delivery therefrom laterally along the well bottom section toward the remote pot chamber flow outlet opening. Consequently, discharge from this depending nozzle tube tip will sweep into this outlet opening particulate solids which tend to collect in this bottom section.

Means whereby pieces of food may be suspended in the frying zone above the lateral nozzles and the jet discharges therefrom may be in the form of a lateral, foraminous rack suitably supported by the cooking pot walls. This rack should have a transverse or peripheral shape generally complementary to the transverse sectional shape of the frying zone defining wider section of the cooking pot for removable nesting in the frying zone above the lateral oil delivery nozzles, to facilitate cleaning thereof, and with its marginal edges juxtaposed closely to the pot chamber sidewalls in this zone, so as to prevent pieces of food supported thereon from falling down therebetween onto the shoulder ledges and into the cold zone deep well. Such pieces of food or parts thereof which may otherwise escape into the well bottom section can be caused to travel forward to the discharge outlet or therethrough into the main valve in the recirculating conduit for checking or blocking flow of oil therethrough. Since in the preferred form of this cooking pot its wider section that circumscribes the frying zone is rectangular, or more specifically square, the periphery of the food-supporting rack should also be of such rectilinear shape, with relatively close tolerance existing between its edges and the opposed sidewall inner faces of the pot chamber thereat. This also avoids the necessity of bounding such rack by side flanges or upstanding sidewalls. While the food pieces or chicken parts effectively may be rested directly upon this lateral rack one may, if he desires, place them in a pan-shaped foraminous basket and immerse the latter to resting support upon this rack. This rack may be supported in a lateral plane immediately above the lateral nozzles by depending legs at its four corners which seat upon the lateral portions of the shoulder ledges.

The discharge section of the recirculating conduit means may be shaped to extend up over the top rim of the open cooking pot and then down to a cross connector or fitting that may support and flow communicate the two lateral nozzles and the depending nozzle to the supply end of this conduit section. The edge of this food-supporting rack is suitably notched to permit downward passage of this conduit discharge section or room for any portion of this cross connector or fitting that may be there located as may be demanded by the particular design of the arrangement of these parts which locates the lateral nozzle tubes immediately below this rack. In any event, it is desirable that these lateral tubular nozzles be located below this lateral rack so that discharge jets thereof do not impinge directly upon or create vigorous currents in the hot oil in which the pieces of food or chicken parts are immersed, since these can tend to tumble the supported food pieces and separate therefrom chunks or particulate solids of breading coatings which may have been applied thereto.

While it is preferred that the cooking pot be of the open top type it can be provided with a gasketed lid to convert it to a pressurized cooking pot, in which case the discharge section of the recirculating conduit means may pass into the top section through a gasketed hole in one of the walls of this section.

It is a practice to provide on one sidewall inner face a guidance mark dictating the elevation of the surface of the oil pooled in the cooking pot chamber, which will assure complete but relatively shallow immersion of the food pieces or chicken parts in the hottest top zone of the frying oil pool. The discharge or delivery section of the present oil recirculating conduit system is provided in the vicinity of the common connection thereof to the three jet nozzles with a small aspirating and bleed hole at or just above the elevation of this pool surface level mark. Such small hole will permit aspiration of air under such conditions as may otherwise tend to siphon back through these nozzles and the conduit discharge section oil from the pot chamber pool as the oil is being drained from the recirculating system. It will also assure that when the pooled oil is being drained through the chamber outlet opening that which may otherwise be trapped for a time in the supply passages of the nozzles, and particularly in that of the depending nozzle which extends down into the deep well bottom section will be more rapidly drained out. Further, this small aspirating and bleed hole will allow drippage therefrom of oil in the elevated loop of the conduit supply section which extends up over the top of the pot rim and down to the common connection thereof with the nozzles, at least until the oil pool is sufficiently depleted by drainage through the pot chamber outlet opening as to uncover the jet openings in the lateral nozzles.

The recirculating conduit means includes in succession a closed filter unit and a driven pump. While the pump may intervene the cooking pot chamber outlet opening and the filter unit it is desirable, in order to avoid fouling the pump with crackling and other particulate solids, such as breading fines, to interpose the filter unit between the pot chamber outlet and the pump, so that the latter passes cleaner oil therethrough. This filter unit is in the form of a tank having an inlet end section provided with an inlet opening, preferably in a side of this section, with this inlet opening flow connected to the cooking pot chamber outlet through a closed, openable, through flow valve. The filter tank inlet end section has its end closed by a removable lid which imposes no control upon the connection between the pot chamber outlet and the inlet in the filter tank inlet section, and the other end of filter tank is closed with an outlet opening therein communicated to the pump inlet. In the preferred form this filter unit tank is generally cylindrical and cup-shaped with its longitudinal axis extending substantially centrally through its end lid, inlet end section and its outlet end section and oriented generally horizontal. If desired, the lid-closed inlet end section of this filter tank may be slightly lower than the other end section so that when the lid is removed complete drainage through the opened end of the inlet end section of the filter tank chamber may be assured. The filter tank chamber has removably nested therein a cup-shaped foraminous retainer basket having a generally cylindrical sidewall, a transverse downstream end wall near the tank outlet which is communicated to the pump inlet, and an open inlet end located in the vicinity of the tank inlet end section and downstream of the inlet opening in the latter, whereby this retainer basket does not interfere with free flow through this filter tank inlet opening. The open inlet end of the foraminous retainer basket is gasketed to the wall of filter tank chamber with the sidewall and downstream end wall of this basket spaced inwardly from opposed tank wall portions. A removable open mouth filter bag is nested in this retainer basket with the open bag mouth removably anchored to the open inlet end of the basket, the latter serving to hold the bag walls out of contact with the filter tank walls so as to avoid appreciable blocking of bag perforations by the tank walls. The filter tank lid has a valved opening therein that is connectable to a discharge and suction tube which may have its far end dipped into a storage and supply pan chamber for receiving at will oil from the recirculating system without requiring filter tank lid removal and also to allow suction of oil into this system from the storage pan chamber with this lid in tank-closing position.

Other objects of the invention will in part be obvious and will in part appear from reference to the following detailed description taken in connection with the accompanying drawings, wherein like numerals identify similar parts throughout, and in which:

FIG. 1 is a side elevational view, with parts broken away and in section, illustrating a preferred embodiment of the hot oil recirculating cooking system of the present invention;

FIG. 4 is a perspective view of the filter bag that is embodied in the filter unit shown in FIGS. 1 to 3 inclusive.

Figure 2:
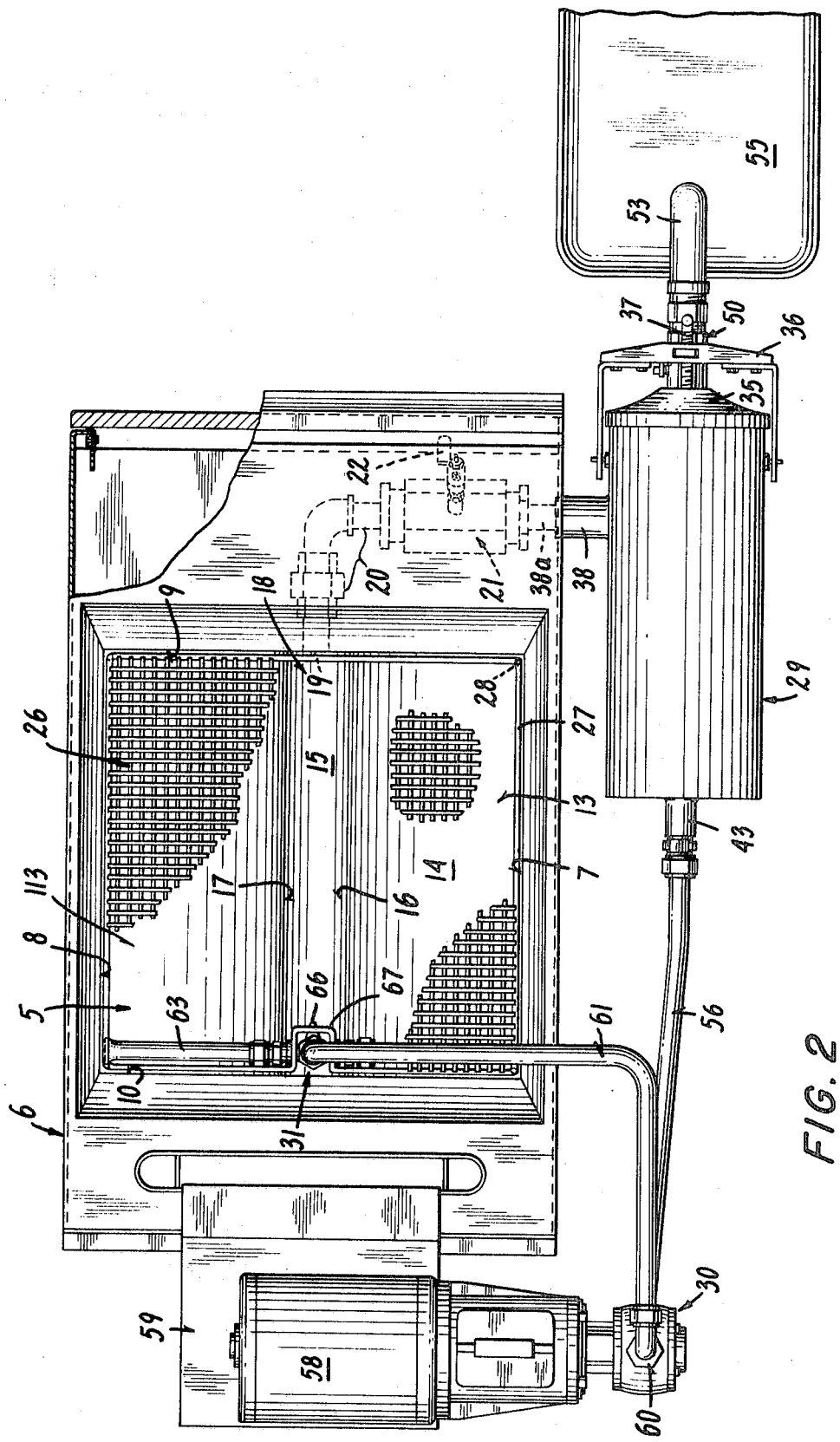
FIG. 2 is a top plan view, with parts broken away and in section, of the apparatus depicted in FIG. 1.

The preferred form of the hot oil recirculating cooking system, which is illustrated in the drawings, includes an open top cooking pot 5 preferably housed in a cabinet or casing 6, suitably supported on a plurality of legs 106. As will be best understood from FIG. 2 the transverse shape of this cooking pot in the upper wider portion thereof is rectangular, preferably square, and defined by a pair of opposed and laterally spaced sidewalls 7 and 8 and a pair of front and back end walls 9 and 10. Such walls may be formed from metallic sheet, such as stainless steel.

Figure 3:
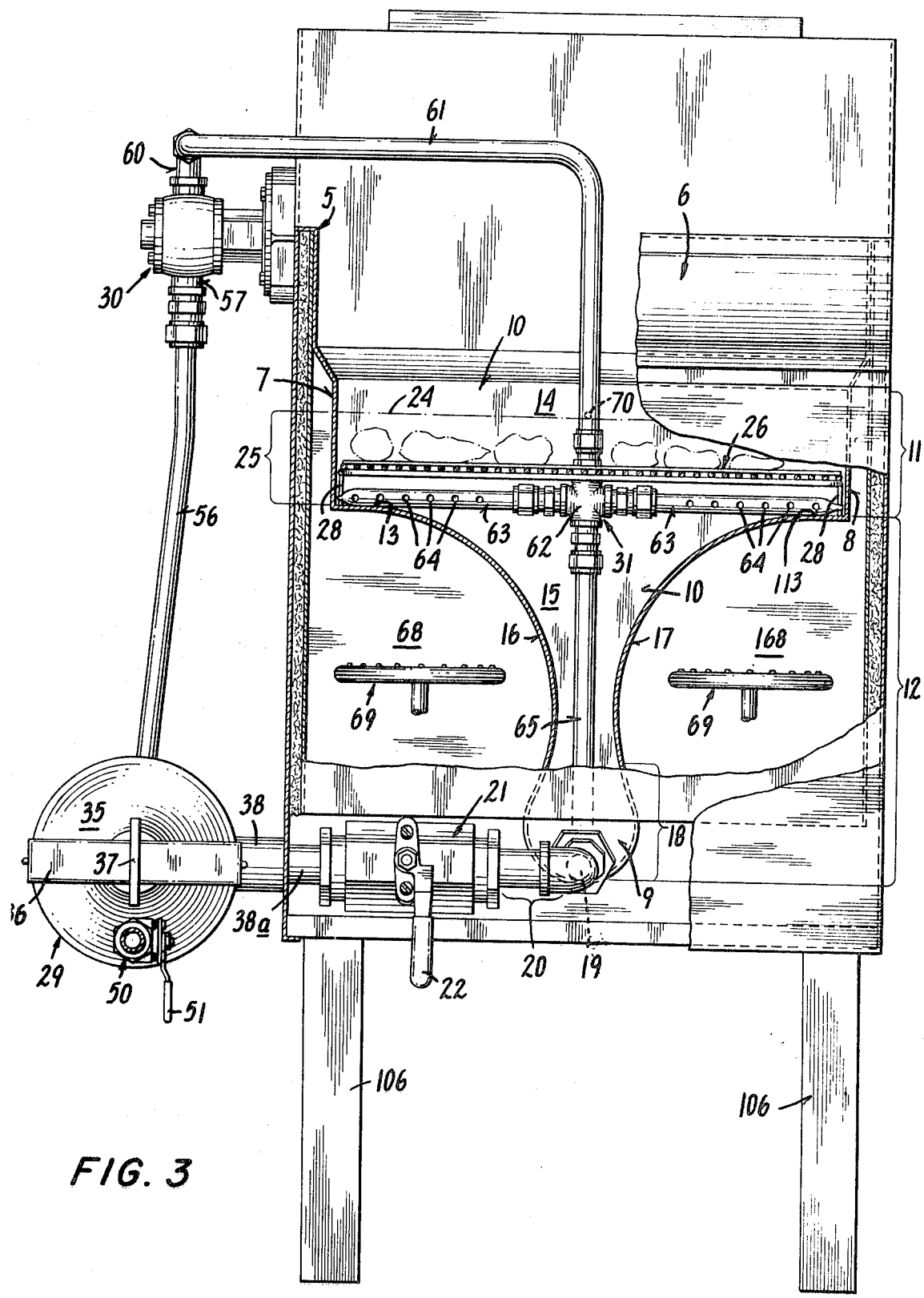
FIG. 3 is a front elevational view, with parts broken away and in section, of the apparatus shown in FIGS. 1 and 2.

The opposed sidewalls 7 and 8 are shaped in allochiral fashion to define therebetween a relatively wide cooking section 11 and a narrower cold zone deep well section 12 with the shaped mergences intervening them providing lateral, transversely shaped shoulder ledges 13 and 113 (see FIG. 3). The longitudinally spaced front and back end walls 9 and 10 close off these sections to provide a cooking compartment 14 and a cold zone deep well compartment 15 with the latter having opposed sidewalls 16 and 17 and closed off by a longitudinally extending bottom section 18. The chamber of this cooking pot 5, including its cooking compartment 14 and cold zone deep well compartment 15, has an outlet opening in the cold zone deep well bottom section 18 at a point of lowest elevation, such as at 19, which is suitably flow connected by pipe fittings 20 to the inlet end of a main through flow manual valve 21 which has a manual manipulative handle 22 shown in the valve-closing position in the drawings.

As is conventional, the back end wall 10 may be provided with an oil pool surface level mark, such as at 23 in FIG. 1, to guide the depth of the pool of oil in the cooking pot chamber which is supplied thereto by the operator, so as to limit the pool surface, indicated in broken lines at 24, to that which is sufficient to define a frying zone 25 in which the pieces of food or chicken parts are to be completely immersed for the frying operation.

Suitable means for supporting the pieces of food or chicken parts within the frying zone 25 may be in the form of a stainless steel, foraminous rack or screen 26 which is, as best seen in FIG. 2, complementary in shape to the transverse shape of the cooking compartment 14 and bounded by a rectangular frame 27. This food-supporting rack 26 may be suitably supported in the frying zone 25 in any desired manner, but, since it must be removable for easy cleaning it is provided at its four corners with depending short legs 28 which seat or rest upon the lateral shoulder ledges 13 and 113. The rack 26 is positioned relative to the oil pool surface 24 so that the food pieces, diagrammatically indicated in broken lines in FIGS. 1 and 3, will be completely immersed in the oil in this frying zone, preferably at shallow depth.

The cooking pot chamber has its outlet opening 19 communicated by suitable conduit means which includes the main valve 21, a filter unit 29, a pump 30, and oil discharge or delivery structure in the form of a nozzle assembly 31. As will be seen from FIGS. 1 and 2 the filter unit 29 is in the form of a cylindrical tank 32 having an inlet section 33 provided with an open end and with its other downstream end 34 closed by a transverse end wall. The inlet end section 33 is closed by a removable cap 35 which is suitably gasketed to the open end of the filter tank. This inlet section preferably has pivotally mounted thereto a yoke 36 which carries a pressure applying manual screw 37 with its inner end adapted to engage the central portion of the lid 35, whereby this lid may be snugly clamped to the open end of the filter tank 32 to close the latter. The inlet end section 33 is provided on the side thereof with a fixed coupling 38 which is flow connected by a nipple 38a to the outlet opening of the main valve 21 (FIGS. 2 and 3) having its bore communicated by an inlet opening 39 which leads to the interior of this inlet end section. Flow through the inlet opening 39 thus is not affected by the mount or removal of the end lid 35.

The main cup-shaped chamber 40 (FIG. 1) of the filter tank 32 has nested therein a cup-shaped, foraminous retainer basket 41 which is preferably formed of expanded metal and provided with an upstream open mouth, suitably spaced annularly inward at 42 with respect to the chamber wall. This retainer basket has its sidewall and downstream transverse end wall suitably spaced from the inner surfaces of the main chamber 40 of the filter tank 32 in order to avoid interference with free flow of oil therethrough to an outlet coupling 43 fixed to the transvese end wall 34. As is illustrated in FIG. 1 the retainer basket 41 has inserted therein a cup-shaped filter bag 44 with its open mouth 45 circumscribed by a hem 46 into which is threaded a C-shaped loop 47 of a manipulative handle 48, so that the latter will facilitate removal of the filter bag from the retainer basket. It will be understood from FIG. 1 that the handle loop 47 is of such dimensions relative to the circumference of the inner wall of the filter tank chamber 40 and an annular spacing ring at 42 of the retainer basket as to jam securely against this inner wall and this ring in a substantially leak-proof manner when the filter bag 44 is inserted in this basket and both are mounted within the filter tank chamber. The perforations of the fabric of the filter bag 44 thus are prevented from being blocked by contact with the filter tank chamber wall.

The filter tank closing lid 35 is equipped with an outlet opening at a low point into which a nipple 49 is threaded for threadably connecting thereto a through flow valve 50 having a manual manipulating handle 51 with its outlet end connected by a threaded nipple 52 to a discharge and suction hose 53 with its open end 54 dipped into an oil supply and storage tank or pan 55. For convenience of transport the oil supply and storage tank 55 may be supported on suitable rollers or casters (not shown).

The outlet coupling 43 which is mounted on the otherwise closed transverse end wall 34 of the filter tank 32 is suitably connected by a pipe or tube 56 to intake 57 of the pump 30. The pump 30 is driven by an electric motor 58 which is suitably supported by a bracket 59 mounted in any suitable manner to the casing or cabinet structure 6. The pump driving motor 58 has its power supply circuitry provided with a suitable manual switch and a thermostat switch (not shown), with this thermostat switch provided with a suitable temperature sensing bulb (not shown) which may be connected through a wall of the cooking pot chamber in the hot frying zone thereof, in conventional manner.

The outlet 60 of the pump 30 is connected by a supply or discharge pipe or tube 61 which, for convenience, may extend over the rim of the open top of the cooking pot 5 and then down to communicative connection with the discharge nozzle assembly 31. This nozzle discharge assembly 31 includes nozzle means to direct discharge jets laterally along the mergence shoulder ledges 13 and 113 for washing particulate solids off of the latter down into the bottom section 18 of the cold zone deep well 10. For this purpose, the nozzle assembly may include a cross fitting 62 into oppositely directed, lateral outlets of which are mounted suitable fittings for supporting in flow communicating manner tubular lateral nozzles 63 which have their outer ends suitably closed off. These lateral nozzles 63 are conveniently supported by seating directly upon the shoulder ledges 13 and 113. Each of the lateral jet directing nozzles 63 is conveniently provided with a series of longitudinally spaced-apart jet openings 64 in the side thereof which faces toward the other end of the shoulder ledge upon which it is seated. These lateral jet directing nozzles 63 are located in the vicinity of the transverse ends of the shoulder ledges which are farthest away from the pot chamber flow outlet 19, so that the jets emanating from the jet openings 64 will direct flow along the shoulder ledges for wash thereof while developing currents in the oil pool in the general direction of the location of such outlet, for facilitating the recirculation of the hot oil, during the frying operation, through the frying zone toward the pot chamber outlet for return flow therefrom through the filter unit 29 and the impelling pump 30.

The downwardly directed opening of the cross fitting 62 supports and is flow connected to an additional nozzle in the form of a depending tube 65 which is medially located between the opposed sidewalls 16 and 17 of the cold zone deep well 10 and into the bottom section 18 of the latter. The tip end 66 of this nozzle tube 65 is turned forward so that a discharge jet opening in the latter is directed laterally along this bottom section toward the pot chamber flow outlet for sweeping into this outlet particulate solids which tend to collect in this section. The back side of the depending nozzle tube 65 is provided, preferably just above the forward bend that defines its tip end nozzle 66, with a jet opening at 66a so as to assure cleaning out the area therebehind.

It will be seen from FIG. 2 that the circumscribing frame 27 of the food-supporting rack 26 is suitably provided with a notch 67 which, when this rack is supported upon the shoulder ledges 13 and 113 by its legs 28, will accommodate such portions of the cross fitting 62 as are located in the same transverse or lateral plane. This will avoid interference by the supply or discharge conduit and nozzle structure with ready removal of this rack to allow cleaning thereof outside of the cooking pot. For clarity of illustration in FIG. 3 an appreciable space has been indicated as intervening the lateral nozzles 63 and the food supporting rack 26. However, it is to be understood that it is preferred to locate this rack down as close as possible to such lateral nozzle structure and the lateral portions of the cross fitting 62 with the rack supporting legs 28 being of such short lengths as will permit this close location.

As will be best seen from FIG. 3 the cold zone deep well sidewalls 16 and 17 are located generally symmetrically with respect to the frying zone chamber sidewalls 7 and 8 and between upwardly extending planes of inner faces of the latter with the well bottom section 18 arranged substantially intermediate these planes. The depending nozzle 65 preferably is centered relative thereto for efficient cleaning of the cold zone bottom section 18 in order to assure that all of the cracklings and other particulate solids, such as flour fines, will be washed therefrom into and through the cooking pot discharge outlet opening 19, since otherwise they may tend to accumulate on the side most widely spaced from the jet flow emanating from the nozzle tip 66 as to cause flow clogging ahead of and at the mouth of the discharge outlet 19.

It will further be noted from FIG. 3 that the mergence portions of the opposed sidewalls of the cooking pot structure with the opposed sidewalls 16 and 17 of the cold zone deep well, which define the intervening shoulder ledges 13 and 113, are smoothly convexed inwardly for encouraging smooth flow therealong and down into the bottom section 18 of this well. This bottom section of the deep well is also smoothly convexed outwardly in bulbous fashion for similarly encouraging smooth flow toward the longitudinal center of the latter for facilitating collection of particulate solids therealong in substantial alignment between the depending nozzle tip 66 and the cooking pot discharge outlet 19.

Such symmetrical shaping of the opposed sidewalls of the cooking pot structure define exterior thereof a pair of outer side spaces 68 and 168 with each being bounded by the inwardly convexed portion and the overhanging, shoulder ledge-defining portion of the sidewall on that side. Within each of the exterior spaces 68 and 168 is located one of a pair of gas burners 69 (FIG. 3) which will transmit heat efficiently by radiation and convection to the deep well sidewall portion and the overhead shoulder ledge thereof on that side for effective conductive transfer to the oil in the deep well and in the superposed frying zone. As has been previously indicated these gas burners are suitably associated with gas supply equipment through which flow of burner gas is controlled by the temperature control equipment which includes a thermostat bulb that is associated with the oil pooled in the frying zone.

In connection with FIG. 1 it has been previously indicated that the inner face of the cooking pot end wall 10 preferably has its inner face provided with an oil surface level mark 23. At the level of this mark the oil discharge or supply equipment leading to the nozzle assembly 31 is provided with a small aspirating and bleed hole 70 at or slightly below the level of the pool surface 24 as dictated by the level mark 23. The relative dimension of this aspirating and bleed hole may be best understood if, by way of example, it is about 3/32nds of an inch in diameter in the event that the supply pipe or tube has a passage that is about ½ inch in diameter. Such small aspirating and bleed opening will permit aspiration of air under such conditions as may otherwise tend to siphon back through the delivery nozzles 63 and 65 and the conduit discharge section 61 oil from the pot chamber pool as the oil is being drained from the recirculating system out through the opened filter tank 29. It will also assure that when the pooled oil is being drained through the pot chamber outlet opening 19 that which may otherwise be trapped for a time in the supply passages of the nozzles, and particularly in that of the depending nozzle 65, will be more rapidly drained out. Further, this small aspirating and bleed hole will allow drippage therefrom of oil in the elevated loop of the conduit supply section, which includes the conduit section 61 that extends up over the top of the pot rim and down to the cross fitting of the nozzle assembly 31, at least until the oil pool is sufficiently depleted by drainage through the pot chamber outlet opening as to uncover the jet openings 64 in the lateral nozzles 63.

In use and operation of the hot oil recirculating cooking system of the present invention let it be assumed that with the main control valve 21 closed sufficient oil is supplied in any suitable manner to the cooking pot chamber as to fill up the cold zone deep well compartment 15 and the frying compartment 14 to the level 24 as dictated by the mark 23. The temperature of the pooled oil may be brought up to a predetermined temperature of about 350° F. by manual and/or automatic control of the burners 69. During this heating the pump 30 will be operated to recirculate the oil from the cooking pot discharge outlet 19 through the assembled and closed filter unit 29, the pump 30 and the discharge or supply assembly 31 for even distribution of heat. After a predetermined period of such recirculation of the oil, which for certain service may be about 10 minutes, with the recirculating oil pooled in the cooking pot chamber at about 350° F., the suitably coated or breaded food pieces or chicken parts will be dropped into the frying zone 25 down upon the support rack 26. For this service a frying time of about 13 minutes may have been selected after which the food pieces or chicken parts will be lifted from immersion in the frying zone section 25 of the pooled and recirculating oil, and allowed to drain. The recirculating of the oil will be continued thereafter for a period, which may be about 10 minutes. This cycle of continuous circulation of the hot oil before, during, and after the frying will then be repeated throughout a day's production. After the last such cycle of operation when the apparatus is to be shut down for the night the pump will be stopped and the main drain valve 21 manually closed. The oil supply and storage tank or pan 55 should then be moved to beneath the lid-closed end of the inlet section 33 of the filter tank 32 and the discharge end 54 of hose 53. The lid drain valve 50 is then opened to drain the oil from the filter unit 29. After this drainage has stopped the lid 35 will be loosened by backing off the tightening screw 37, so as to crack the lid seal without completely freeing the lid, thereby insuring complete drainage. The lid clamping screw is then completely loosened and the yoke 36 is swung up to free the lid so that the inlet end section of the filter tank 32 is opened for permitting drainage of oil therefrom into the supply and drainage tank or pan, so that substantially all of the oil will flow freely from the filter tank chamber by virtue of the fact that the open end of the filter tank is slightly lower than the closed discharge end 34 thereof. The retainer basket 41 and the filter bag 44 housed therein will then be removed and the oil will be drained from the cooking pot chamber through the discharge outlet 19 upon opening of the main drain valve 21. Then the interior of the open filter tank 32 and the cooking pot chamber will be thoroughly cleaned, oil washed and wiped down.

If it is desired to store the filtered oil in the cooking pot chamber overnight, after the filter bag 44 has been cleaned and replaced in the retainer basket 41 these may be replaced in the filter tank chamber 40, and the lid 35 replaced. With the main valve 21 reclosed and the lid valve 50 open the suction hose 53 will have its end 54 dipped into the supply tank or pan chamber 55 and the pump 30 may be restarted to pump the oil back into the cooking pot chamber to pool the surface 24 of the oil therein at the level of the mark 23 for overnight storage. With the main valve 21 still closed, the lid of the filter tank may be removed and the retainer basket and filter bag removed to leave the filter tank chamber open overnight, for assembly the next morning of the parts of the filter unit before beginning the first cycle of operation the next day.

It will be understood that variations of conditioning for overnight idleness of the apparatus may be practiced with ease, such as by omitting the insertion into the filter tank of the cleaned filter bag and the retainer basket for repumping the oil back into the cooking pot chamber for overnight storage. Also, for drainage of the filter tank chamber and the cooking pot chamber, instead of removing the lid 35 thereof the lid valve 50 may be opened for effecting such drainage through the hose 53 into the discharge and supply tank or pan 55, and then the filter tank lid may be removed so that the filter tank may be left open overnight.

When overnight storage of oil in the deep well compartment 15 and frying zone section 25 of the pot compartment 14 is practiced, reconditioning the apparatus the next morning for the first frying operation requires replacement of the retainer basket 41 with a clean filter bag 44 nested therein and reclosure of the filter tank 32 by its lid 35 with the lid valve 50 closed. The main valve 21 will be opened and the burners 69 will be fired to apply heat to the oil stored in the frying zone and deep well compartments 25 and 15. When the temperature of the pooled oil in the frying zone compartment is raised to 350° F. the oil in the deep well compartment 15 is stirred with a long handled spoon, the main drain valve 21 is opened, and the recirculating pump 30 is started to run for the pre-frying period before the food pieces or chicken parts are dropped upon the support rack 26 to immersion in the hot oil in the frying zone 25.

It will be understood that by recirculating the heated oil through the external conduit system, the frying zone 25 of the cooking pot compartment 14 and the deep well compartment 15 assures even heat distribution throughout the oil in the cooking pot chamber which assures uniform color of cooked food pieces or chicken parts. This even heat distribution permits maintenance of the predetermined maximum temperature of the oil pooled in the cooking pot chamber within tolerance limits which prevents overheating to a degree that can scorch the oil to impart an undesirable flavor to the fired food. The construction of the various parts permits ready nesting assembly of those which are not mechanically connected together for facilitating removal for easy cleaning. Also, by repeated filtering of the oil during and between successive cycles of frying it is maintained in a sufficiently clean condition as to permit storage thereof overnight in the cooking pot chamber for immediate use the next morning to begin the successive cooking operations.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is the novel subjects matter defined in the following claims.

1. A hot oil recirculating cooking system for deep fat frying food, such as chicken parts, including a cooking pot that has a chamber in which such food is to be fried by immersion in a pool of the hot oil during a cooking cycle, said pot chamber having a flow outlet in the bottom area thereof and an inlet in the top area thereof, conduit means providing a through flow path between said pot chamber outlet and inlet including a pump and an openable closed filter tank having a chamber containing removable filtering means, characterized by the combination of 1. means defining in the bottom area of said pot chamber a depending cold zone deep well having transversely spaced and opposed sidewalls merged with more widely spaced pot chamber sidewalls thereabove with the latter defining therebetween the frying zone above the well cold zone, the mergence providing at least one upwardly facing shoulder ledge in the vicinity of the bottom of the frying zone, said cold zone well having an elongated and relatively narrow, well-closing bottom section which extends laterally between and in the direction generally parallel to the surfaces of its transversely spaced sidewalls with the pot chamber flow outlet located in the vicinity of one closed end of said well bottom section;
2. heating means exterior of said pot to apply heat externally of said pot chamber to at least one of said well sidewalls and to said mergence of this sidewall with the frying zone sidewall thereabove in the vicinity of its shoulder ledge; and
3. a discharge nozzle assembly flow connected to said conduit means and located in the pot chamber frying zone and the cold zone well, this assembly including nozzle means to direct discharge jets laterally along said mergence shoulder ledge for washing particulate solids off of the latter down into the bottom section of said well, and additional nozzle means depending down into said well bottom section to the vicinity of the other closed end of the latter to direct at least one discharge jet laterally along said bottom section toward the pot chamber flow outlet for sweeping into this outlet particulate solids which tend to collect in this section.

2. The cooking system as defined in claim 1 characterized by said cold zone well sidewalls being located generally symmetrically with respect to said frying zone chamber sidewalls and between upwardly extending planes of inner faces of the latter sidewalls with the well bottom section arranged substantially intermediate these planes, a pair of similar upwardly facing and transversely spaced mergence shoulder ledges being provided thereby, and a pair of said heating means being provided with each arranged relative to one of said mergence shoulder ledges and the well sidewall which is associated therewith with the well bottom section being arranged between said pair of heating means, said nozzle assembly having a pair of said lateral jet directing nozzle means with each associated with one of said mergence shoulder ledges for such washing thereof.

3. The cooking system as defined in claim 2 characterized by the provision of a lateral food-supporting, foraminous rack which is of peripheral shape substantially complementary to the transverse sectional shape of the frying zone, and removably nested in this frying zone above said pair of lateral jet directing nozzle means.

4. The cooking system as defined in claim 3 characterized by said pair of lateral jet directing nozzles being in the form of a pair of oppositely directed and transversely extending tubes closed off at their outer ends and respectively mounted immediately above said mergence shoulder ledges in the vicinity of the transverse ends thereof which are located farthest away from the pot chamber flow outlet and immediately above these shoulder ledges for wash thereof, each of said nozzle tubes having a series of longitudinally spaced-apart jet openings in the side thereof which faces toward the other end of the shoulder ledge above which it is mounted.

5. The cooking system as defined in claim 4 characterized by a plurality of support members depending from said rack and resting upon said mergence shoulder ledges to support said rack in said frying zone in a lateral plane immediately above said pair of lateral jet directing nozzle means.

6. The cooking system as defined in claim 3 characterized by said conduit means having a discharge section leading down through said frying zone to said discharge nozzle assembly which is equipped with a small aspirating and bleed hole in a side thereof that is located in the vicinity of a predetermined level of the surface of the intended hot oil pool in the cooking chamber frying zone in which said food-supporting rack and its food load will be immersed.

7. The cooking system as defined in claim 2 characterized by the provision of said pot chamber flow outlet being a lateral flow-directing opening located in the end of said well bottom section at a point of lowest elevation toward which said depending nozzle means directs jet discharge.

8. The cooking system as defined in claim 1 characterized by said conduit means having an intake section connected to said pot chamber outlet and extending from the latter to an inlet opening in an inlet end section of said filter tank and equipped with a normally closed, openable, through flow valve; said tank having its inlet end section closed by a removable lid with its other downstream end section being closed and equipped with an outlet communicated to the inlet of said pump by another section of said conduit means.

9. The cooking system as defined in claim 8 characterized by said filter tank being in the form of a generally cylindrical, cup-shaped tank having its longitudinal axis extending substantially centrally through its lid, inlet end section and its outlet end section and oriented generally horizontal, said tank chamber having removably nested therein a cup-shaped foraminous retainer basket having a generally cylindrical sidewall, a transverse downstream end wall and an open inlet end located in the vicinity of said tank inlet section downstream of the inlet opening in the latter and gasketed to the wall of said tank chamber with its sidewall and downstream end wall spaced inwardly from opposed tank wall portions, and a removable open mouth filter bag nested in said retainer basket with its open mouth removably anchored to the open inlet end of said retainer basket.

10. The cooking system as defined in claim 9 characterized by said filter tank lid having a valved opening therein connectable to a discharge and suction tube.

* * * * *